United States Patent [19]
Barrett

[11] Patent Number: 5,625,543
[45] Date of Patent: Apr. 29, 1997

[54] POWER CONVERTER WITH HARMONIC NEUTRALIZATION

[75] Inventor: Alfred H. Barrett, Carmel, Ind.

[73] Assignee: Delco Electronics Corp., Kokomo, Ind.

[21] Appl. No.: 317,504

[22] Filed: Oct. 4, 1994

[51] Int. Cl.$^6$ .................................................. H02M 5/458
[52] U.S. Cl. .................................................. 363/44
[58] Field of Search .................. 363/34, 37, 39, 363/40, 45, 48, 126, 131, 133

[56] References Cited

U.S. PATENT DOCUMENTS

| Re. 27,916 | 2/1974 | Kakalec | 323/61 |
| Re. 28,359 | 3/1975 | Hart et al. | 323/56 |
| 2,143,745 | 1/1939 | Sola | 171/119 |
| 2,896,180 | 7/1959 | Brown | 336/155 |
| 2,938,180 | 5/1960 | DeWitz | 333/78 |
| 3,122,699 | 2/1964 | Schohan | 323/83 |
| 3,148,326 | 9/1964 | Baycura et al. | 323/56 |
| 3,253,212 | 5/1966 | Wentworth | 323/56 |
| 3,525,035 | 8/1970 | Kakalec | 323/61 |
| 3,573,605 | 4/1971 | Hart et al. | 323/56 |
| 3,573,606 | 4/1971 | Hart et al. | 323/60 |
| 3,965,408 | 6/1976 | Higuchi et al. | 321/25 |
| 5,134,556 | 7/1992 | Courier de Mere | 363/37 |

Primary Examiner—Aditya Krishnan
Attorney, Agent, or Firm—Mark A. Navarre

[57] ABSTRACT

An AC/DC harmonic neutralizing power converter. The power converter includes a first rectifier, load output terminals for delivering DC power to a load, and a harmonic neutralizing converter. The first rectifier includes an input to receive AC input power and an output. The harmonic neutralizing converter comprises a power switching inverter and a second rectifier. The power switching inverter includes an input connected to the output of the first rectifier, an LC resonant circuit comprising a series connected capacitor and inductor, and an output. The second rectifier of the harmonic neutralizing converter has an input connected to the output of the inverter and an output connected in voltage additive relationship to the output of the first rectifier. The added outputs of the rectifiers is connected to the load output terminals such that the output voltage on the load output terminals substantially equals the added output voltages of the rectifiers. In this manner, the power converter draws from the power source substantially sinusoidal current of a frequency substantially equal to the frequency of the input signal provided by the AC power source. Various disclosed embodiments include the use of a neutralizing autotransformer, an isolating transformer to provide for inductive coupling to a battery and full-bridge switching.

26 Claims, 15 Drawing Sheets

POWER CONVERTER WITH HARMONIC NEUTRALIZATION

BACKGROUND OF THE INVENTION

1. Field of the Invention

The present invention relates to AC-DC power converters, and, more particularly, to the provision of a resonant power converter having harmonic neutralization that has application in battery chargers and power supplies for automotive, industrial, and a variety of consumer applications.

2. Description of the Related Art

Some electric loads cause the generation of harmonic currents on the power supply to which these loads are connected. These harmonic currents are undesirable as they cause non-optimal use of the power source by the loads. As a consequence, some European countries have imposed stringent requirements for the elimination of such harmonics, referred to herein as "harmonic neutralization", through the standard known as IEC 555-2. Other countries are contemplating the requirement for harmonic neutralization.

Certain types of electrical loads, such as electrical heating units, are inherently free from the generation of harmonic currents while others, such as power supply type loads, normally produce large harmonics of current. For example, when an ordinary AC input power converter is operated from the power source provided by the electric utility service, the power converter is likely to produce harmonic current. Specifically, though the power source has a sinusoidal voltage, such as the 60 Hz power source provided in the United States, the power converter connected to the sinusoidal voltage power source draws non-sinusoidal current. The current drawn by the power converter often has a distortion content which ranges from 25 to 150% thereby creating low-frequency conducted interference and unduly taxing the current supplying capacity of the power source.

When a power converter includes harmonic neutralization, the power converter ideally draws sinusoidal current from the sinusoidal voltage power source. The harmonic neutralizing power converter does not create low-frequency conducted interference, and, if the converter's input current is in phase with its input voltage, the converter provides optimum utilization of the power source. Under these circumstances, the power converter looks like a linear resistive load to the power source and the power factor of the converter is unity—the optimum.

The employment of harmonic neutralization is well known in the art in switchmode, i.e., in pulse-width modulation (PWM), power supplies. Several circuit topologies exist which, when used with PWM and suitable control loops, meet current harmonic neutralization standards. Some of the these topologies support outputs of several hundred watts. Industrial loads, ranging up to and beyond a kilowatt and which normally generate large harmonic currents, are sometimes supplied by power conditioning equipment employing active and/or passive harmonic neutralization circuits to meet harmonic neutralization standards. However, the use of PWM to achieve harmonic neutralization is limited from an implementation viewpoint in many respects. First, power converters using PWM for harmonic neutralization are costly to manufacture, usually require additional control of electromagnetic interference (EMI), are of significant size and weight, operate inefficiently at high frequencies, and adapt poorly to induction coupling. Induction coupling is desirable in some applications, such as in providing for easier, safer, and more reliable battery charging. The likelihood of the imposition of harmonic neutralization standards as in the United States and the retention of existing standards as in Europe makes it desirable to develop a power converter which does not possess the aforementioned limitations of PWM power supplies.

Resonant converters are advantageous over switchmode (PWM) converters for several reasons which are discussed hereinafter. Therefore, resonant converters may serve as a viable alternative to PWM converters if harmonic neutralization can be achieved with resonant converter topology. Though the basic concepts involving resonance in electrical circuits were developed during the early days of the development of radio technology over fifty years ago, the evolution of resonant technology has been generally limited to the resolution of specific problems, e.g. the commutation of silicon controlled rectifiers (SCRs). A brief look at the history of power supplies is instructional when comparing PWM converters to resonant converters.

Early power supplies often used a line frequency power transformer and a linear regulator consisting of vacuum tubes or, in later supplies, power transistors. These early power supplies were generally large, heavy and inefficient. DC—DC type power supplies used mechanical vibrators, vacuum tubes or switching power transistors to accomplish inversion (DC to AC transformation) when isolation or a significant voltage transformation was required. When vacuum tubes or switching transistors were employed, the regulation function of the power supply was often accomplished by PWM or by pulse-frequency modulation. The introduction of silicon power transistors, which were capable of dissipating several hundred watts and switching in a few microseconds, had an impact on the popularity of PWM for regulation. Today, PWM still prevails as the means for regulating a vast majority of commercially available power supplies.

The availability of high speed silicon power transistors resulted in the emergence of PWM power supplies having increasingly higher feasible power levels. However, these power supplies were generally limited to only a few kilowatts. In the late 1960's the SCR became available for use in operation at several kilowatts and above. However, because the SCR has no means by which it can interrupt its own current flow, i.e., self-commutate, forced commutation was necessary for the SCR to operate in DC systems. The need for forced commutation prompted the development of resonant circuits in which ringing is used to produce a reversal in current flow. Similarly, since the mid-1980's, resonant power technology is utilized with increased frequency in power circuits due to the introduction of other switching devices such as bipolar transistors, MOSFETs, IGBTs, etc. Though these devices, unlike SCRs, do not necessarily require the use of resonance for commutation, resonance can be employed where it is advantageous over PWM, such as at high operating frequencies.

When operated at the resonant frequency of its tank circuit (as used herein, the term "tank" refers to the combination of a transformer or inductor and the resonant capacitor connected thereto), the resonant converter has a pure sine wave of tank current at that frequency. Therefore, at the time the square wave of excitation voltage produces a voltage transition on its power switching devices, these devices, in resonant converters, are not necessarily conducting current. Low switching losses are produced in these devices when the current is zero. Thus this condition, commonly referred to as zero-current switching, is desirable. With resonant converters the dominant loss is conduction loss. However, conduction losses are not strongly related to operating frequency and, therefore, the resonant converter can operate efficiently at a high frequency. For example, a resonant converter can be designed to operate efficiently at a frequency that is typically five to ten times higher than a PWM converter of the same power level using the same power switching devices.

A resonant converter is further advantageous as it produces little electromagnetic interference (EMI). Because a resonant converter develops a sinusoid of current, as opposed to a fast rising quasi-square wave, little EMI is produced. Further, the components of the resonant converter are generally fewer in number and less costly than the components required for a PWM converter. The resonant converter's components are also of a smaller volume and weight thereby permitting applicability of the converter in a smaller or more weight sensitive environment than is possible with PWM. It is therefore desired to provide a power converter having harmonic neutralization which uses resonant power technology to gain the advantages inherently provided by resonant converters.

As previously mentioned, resonant converters are known to be advantageous for having low switching loss. However, there are problems associated with the use of resonant converters that should be considered. For example, switching losses may be created when the output of the resonant converter is controlled over a wide range. Specifically, the output voltage or current of a resonant converter is typically controlled by changing its operating frequency over a range of frequencies above or below the converter's resonant frequency. When the operating frequency is above or below the resonant frequency, the tank current is out of phase with the excitation voltage. Generally, this phase difference creates switching loss and may increase EMI as well. Specifically, such losses may occur over an operating frequency range which extends from several times the resonant frequency down to one-half (½) the resonant frequency.

Another problem occurs when the operating frequency is close to the resonant frequency. In such a situation, the voltage or current in the tank components is strongly related to the Q of the circuit. Thus, the control curves are highly nonlinear and strongly affected by the load. Therefore, it is desired to provide a controlled power converter using resonant power technology and having harmonic neutralization which avoids the problems encountered when the converter is controlled by changes to the converter's operating frequency.

Yet another potential problem associated with the resonant converter is the conductive losses that may be generated. A resonant converter may have significantly higher conduction loss than is generated with a PWM converter. However, if the switching losses of the resonant converter is minimized as described hereinabove, the resonant converter can still incur lower total loss than the PWM converter. Thus, the resonant converter's conductive losses do not preclude its desirability over the use of PWM converters.

As previously stated, the problem of switching loss for a resonant converter can be eliminated when the series resonant converter operates at a frequency below one-half of its resonant frequency. If the controlled switches of the resonant converter are turned off prior to the initiation of a second cycle of ringing, current in the tank circuit ceases to flow. This mode of operation of a resonant converter is referred to herein as the "discontinuous current mode of operation". When in the discontinuous current mode of operation, the resonant converter can have a constant on-time drive.

A series resonant converter not only has low switching loss in all of its switching components if operated at and/or below one-half of its resonant frequency, but is also advantageous over other resonant converters due to its low component count. Further, over an operating frequency range from zero to one-half of its resonant frequency, a series resonant converter's output current is nearly linearly proportional to its operating frequency, the tank current waveform is nearly independent of the repetition rate, and the average current output is proportional to the repetition rate.

When operating in the discontinuous current mode, the output current of a series resonant converter is quite independent of its output voltage. Specifically, from zero output voltage to an output voltage at which the input/output voltage transformation ratio is approximately unity (1.0), the output current of a series resonant converter operating in discontinuous current mode is nearly constant. At output voltages reaching a voltage transformation ratio of unity, the output current falls off rapidly as the output voltage exceeds the tank excitation voltage and the tank becomes unloaded. In addition to the provision of an essentially constant output current, the series resonant converter tolerates any passive load and needs no protection circuitry to limit its output voltage or current. Therefore, it is desirable to employ a series resonant converter topology for a power converter having harmonic neutralization to utilize the aforementioned advantages inherently provided with series resonant converters.

A series resonant topology is utilized in an AC to DC converter in U.S. Pat. No. 4,143,414 to result in a reduction in harmonic current distortion. Each phase of the three-phase AC source is first rectified by a full-wave bridge rectifier to convert the AC phase voltage to a rectified DC voltage. Each DC voltage is in turn provided to a resonant bridge inverter to invert the DC voltage to an AC voltage. Then, the AC voltage is converted by another full-wave rectifier to a full-wave rectified DC voltage. The combination of the series resonant bridge inverter and the second full-wave bridge rectifier behaves somewhat like a resistive load for the first full-wave rectifier to reduce the harmonic current distortion produced in the three-phase AC voltage source. However, though a reduction in harmonic distortion occurs, current harmonics are generated in each phase of the three-phase source because the DC to DC rectifiers (the combination of the series resonant bridge inverter and the second full-wave bridge rectifier) are non-linear and do not present an ideally resistive load. As a consequence, additional circuitry is used in the converter of U.S. Pat. No. 4,143,414 to eliminate the harmonic current generated by the DC to DC rectifiers.

Therefore, it is desired to develop a harmonic neutralizing power converter using series resonant topology which requires a minimal number of components to achieve neutralization and which does not generate its own harmonics which must be eliminated through the use of additional circuitry. Further, as previously discussed, it is desired that control of the converter be accomplished by means other than modulation of the operating frequency of the series resonant converter.

SUMMARY OF THE INVENTION

The present invention provides a harmonic neutralizing power converter. The power converter employs series resonant topology to capitalize on the inherent advantage of such topology over pulse-width modulation converters. Further, neutralization by the harmonic neutralizing power converter is achieved without adjusting the operating frequency of the resonant converter.

The invention comprises, in one form thereof, an AC to DC power converter. The power converter includes a first rectifier having an input to receive AC input power and an output. The power converter also includes load output terminals for delivering DC power to a load, and a harmonic neutralizing converter. The harmonic neutralizing converter comprises a power switching inverter and a second rectifier. The power switching inverter of the harmonic neutralizing converter has an input connected to the output of the first rectifier, includes an LC resonant circuit having a discrete inductor, and has an output. The second rectifier of the harmonic neutralizing converter has an input connected to the output of the inverter and output connected in voltage additive relationship to the output of the first rectifier. The added outputs of the rectifiers is connected to the load output terminals. In this manner, the output voltage on the load output terminals substantially equals the added output voltages of the rectifiers.

The LC resonant circuit of the harmonic neutralizing converter is a series resonant circuit. Use of series resonant technology is advantageous over pulse-width modulation for a multiplicity of reasons including lower switching losses, generation of little EMI, minimization of the number of high power components required for power conversion, and generation of an output current which is nearly proportional to the load voltage.

An advantage of the present invention is the provision of a power converter having harmonic neutralization using resonant converter topology to thereby gain several advantages over the use of PWM topology.

Another advantage is the provision of a harmonic neutralizing power converter having little or no switching losses.

Yet another advantage of the present invention is the provision of a harmonic neutralizing power converter which produces little EMI.

Still another advantage is the provision of a harmonic neutralizing power converter using few high power components to thereby minimize the volume and weight of the converter.

Another advantage of the present invention is the provision of a power converter having harmonic neutralization using series resonant converter topology to capitalize on the nearly constant output current, independent of load voltage, generated by series resonant converters.

Yet another advantage of the present invention is the provision of a harmonic neutralizing power converter including series resonant topology wherein the output is not regulated by the adjustment of the operating frequency of the series resonant topology to avoid the problems of switching loss, generation of EMI, and nonlinearity of the control curves which may be caused by such regulation.

Still another advantage of the present invention is the provision of a harmonic neutralizing series resonant power converter which minimizes the production of current harmonics in the source.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
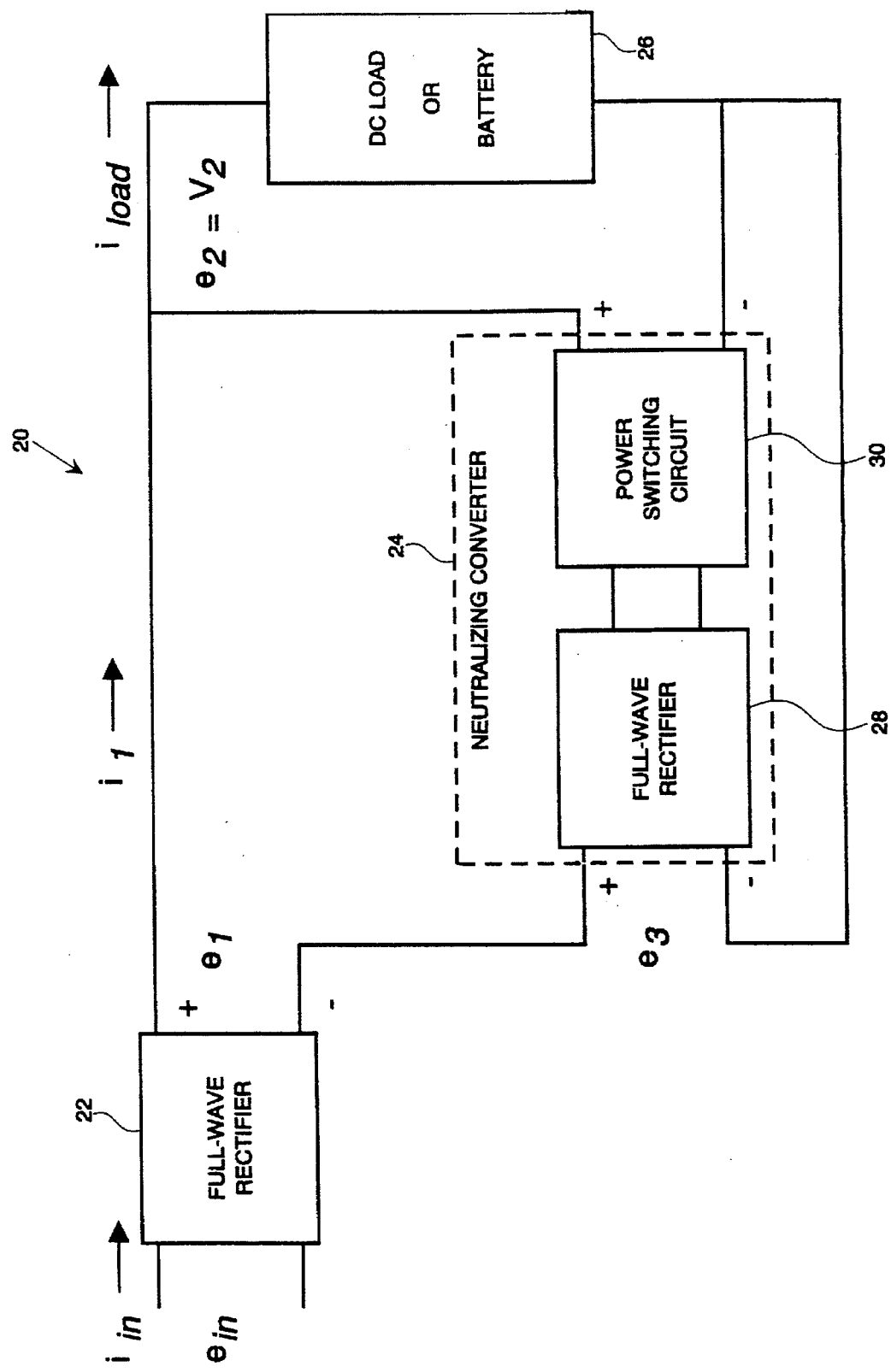
FIG. 1 is a block diagram of the harmonic neutralizing power converter of the present invention.

Referring now to the drawings and particularly to FIG. 1, there is shown a block diagram of the power converter of the present invention having harmonic neutralization. AC/DC converter circuit 20 comprises first full-wave rectifier 22, neutralizing converter 24, and load 26. First rectifier 22 includes an input for receipt of AC input power and an output. Load 26 may comprise a battery, for example, if AC/DC converter circuit 20 comprises a battery charger circuit. Neutralizing converter 24 includes second full-wave rectifier 28 and power switching inverter circuit 30. As is explained in greater detail hereinafter, the output voltage of neutralizing converter 24 is added to the output voltage of first rectifier 22 to equal the voltage of load 26. Specifically, power switching circuit 30 has an input connected to the output of first rectifier 22. Second rectifier 28 has an input connected to the output of power switching circuit 30, and an output connected in voltage additive relationship to the output of first rectifier 22. The added outputs of first and second rectifiers 22 and 28 are connected to the load output terminals of load 26. In this manner the output voltage on the load terminals of load 26 is substantially equal to the sum of the output voltages of both first rectifier 22 and second rectifier 28. Also, power switching circuit 30 of neutralizing converter 24 comprises an LC resonant converter. Use of a resonant converter allows the operating load line to be optimized for harmonic reduction. In fact, satisfactory harmonic reduction may be accomplished without loop control, i.e. with operation of the resonant converter at a fixed frequency.

Before considering the various embodiments of neutralizing converter 24 disclosed herein, it is useful to discuss the theoretical operation of AC/DC converter circuit 20 of FIG. 1. For perfect harmonic neutralization to be achieved, no current harmonics of the power source frequency are generated and the input current to the converter is not phase shifted from the input voltage—the power factor (PF) is unity and optimum.

For power supplied to first full-wave rectifier 22, input voltage, $e_{in}$, and input current, $i_{in}$, are:

$$e_{in}=V_1*\sin(2*pi*f*t) \quad (1)$$

$$I_{in}=I_1*\sin(2*pi*f*t)*\cos(\text{theta}) \quad (2)$$

where $V_1$ is a constant equal to the peak value of the input voltage sinusoid, f is the frequency of the input power (for example, 60 Hz), t is time, $I_1$ is a constant equal to the peak value of the input current sinusoid, and theta is the power factor angle. If neutralizing converter 24 provides perfect harmonic neutralization then theta is zero and input current, $i_{in}$, becomes:

$$i_{in}=I_1*\sin(2*pi*f*t) \quad (3)$$

Assuming that the rectifying process of first full-wave rectifier 22 is perfect, the output voltage from first rectifier 22, $e_1$, and the output current from first rectifier 22, $i_1$, are:

$$e_1=V_1*3F(t)3 \quad (4)$$

$$i_1=I_1*3F(t)3 \quad (A) \quad (5)$$

where $3F(t)3$ is the waveform resulting from first rectifier 22, and $\Omega F(t)\Omega$ is equal to $3\sin(2*pi*f*t)3$.

If one assumes that load voltage, $e_2$, is pure DC, then $$e_2=V_2=e_1+e_3 \quad (6)$$

where $e_3$ is the input voltage to neutralizing converter 24 and $V_2$ is a constant equal to the output voltage. Therefore, $$e_3=V_2-V_1*3F(t)3 \quad (B) \quad (7)$$

Assuming that first and second rectifiers 22 and 28 and power switching circuit 30 are lossless, then the input power, $P_{in}$, and the output power, $P_{out}$, are:

$$P_{in}=e_{in}*i_{in}=[V_1*F(t)]*[I_1*F(t)] \quad (8)$$

$$P_{out}=V_2*[I_2*F2(t)] \quad (9)$$

Note that input power, $P_{in}$, is a sine-squared function of time. Because neutralizing converter 24 has no energy storage capacity, output power, $P_{out}$, must also be, and is, a sine-squared function of time.

The output power of neutralizing converter 24, $PC_{out}$, is:

$$PC_{out}=e_3*i_1=[V_2-V_1*3F(t)3]*[I_1*3F(t)3] \quad (10)$$

$$PC_{out}=[V_2*I_1*3F(t)3]-[V_1*I_1*F^2(t)] \quad (11)$$

Though $V_2$ may be less than $V_1$, this requires that the neutralizing converter have bidirectional capability. To avoid complexity, such a bidirectional capability is not considered herein. Thus, $V_2$ is greater than or equal to $V_1$. If $V_2$ equals $V_1$, then $$PC_{out}=[V_1*I_1*3F(t)3]-[V_1*I_1*F^2(t)] \quad (12)$$

$$i_{load}=I_1*F^2(t) \quad (13)$$

If $V_2$ is greater than $V_1$, then $$PC_{out}=[V_2*I_1*3F(t)3]-[V_1*I_1*F^2(t)] \quad (14)$$

$$i_{load}=I_2*F^2(t)=(V_1/V_2)*I_1*F^2(t) \quad (15)$$

The average handling capacity of neutralizing converter 24, $PC_{avg}$, determined by integrating equation (15) from t=0 to t=1/(2*f) is $$PC_{avg}=[2*V_2*i_1/pi]-[V_1*I_1/2] \quad (16)$$

$$PC_{avg}=V_1*I_1*(0.637V_2/V_1)-0.5) \quad (17)$$

The handling capacity of neutralizing converter 24 expressed in terms of per unit of power delivered to the load, $PC_{pu}$, is $$PC_{pu}=(1.273*V_2/V_1)-1$$

Thus, where $V_2=V_1$, $PC_{pu}=0.273$ meaning that neutralizing converter 24 handles less than 100% of the output power or, more specifically, approximately 27.3% of the output power.

To determine the load line requirements for neutralizing converter 24, determine the relationship between $e_3$ and $i_1$. Combining equations (A) and (B) above, $$e_3=V_2-(V_1*i_1/I_1)$$

Figure 2B:
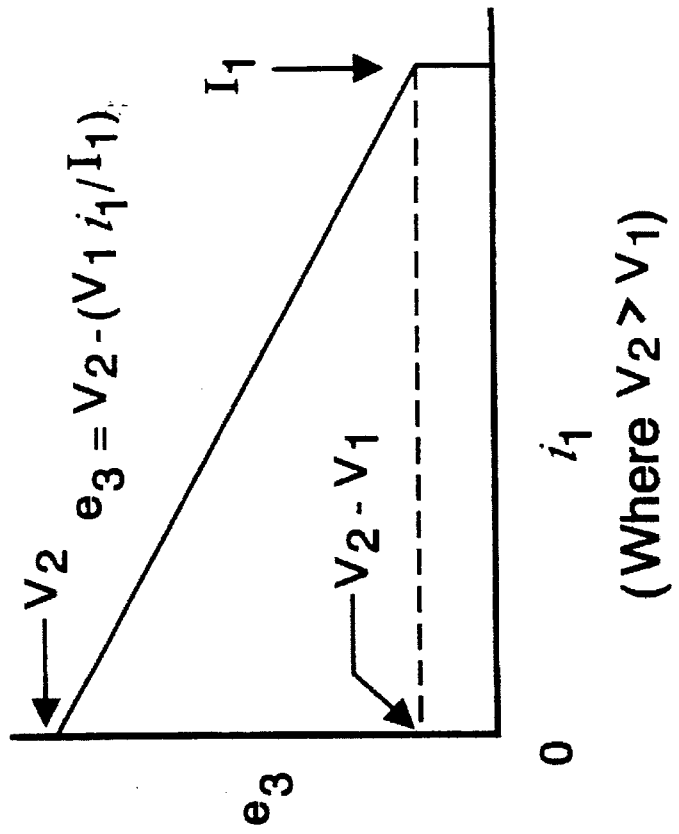
FIGS. 2A and 2B are graphs of the load line of the ideal harmonic neutralizing converter of the present invention under conditions in which the output voltage is equal to the peak of the input voltage sinusoid and greater than the peak of the input voltage sinusoid, respectively.
Figure 2A:
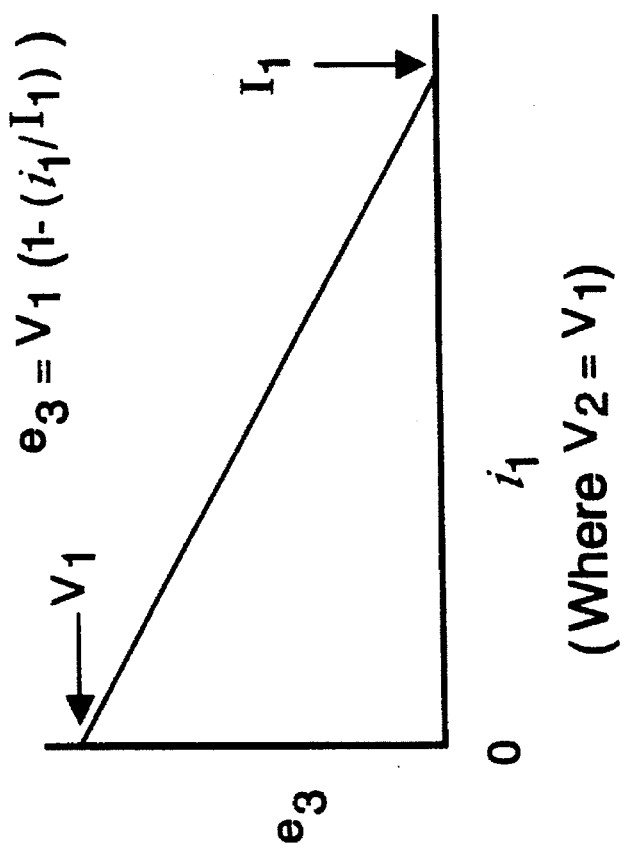

As expected, there is a linear relationship between output voltage $V_2$ and output current of neutralizing converter 24. This linear voltage-current load line relationship is illustrated in FIGS. 2A–2B. In FIG. 2A, $V_2$ is equal to $V_1$. In FIG. 2B, $V_2$ is greater than $V_1$.

Figure 3:
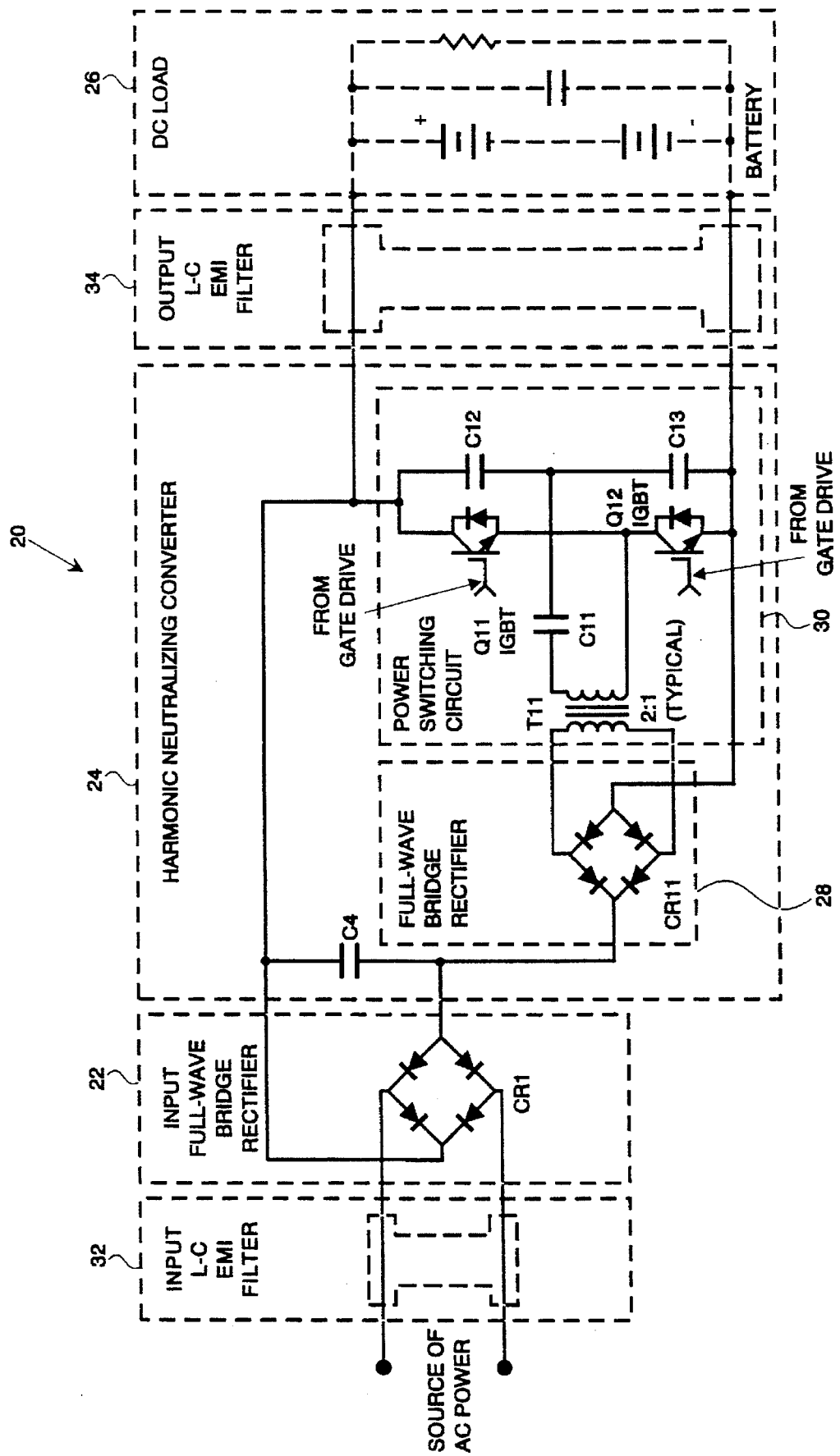
FIG. 3 is a schematic diagram of one embodiment of an AC/DC power converter with harmonic neutralization.

Referring now to FIG. 3, there is shown a schematic diagram of one embodiment of an AC/DC power converter with harmonic neutralization. AC/DC converter circuit 20 includes first full-wave bridge rectifier 22, harmonic neutralization circuit 24 and load 26, as previously described in the description of FIG. 1. AC/DC converter circuit 20 also comprises input filter 32 and output filter 34. Input power, typically from a 50 Hz or 60 Hz utility source, first flows through input filter 32 which reduces conducted common mode and conducted differential mode interference. The AC output from input filter 32 is then rectified by first full-wave bridge rectifier 22 (CR1) and filtered with a small amount of capacitance via C4 of neutralizing converter 24 to produce low impedance for the output current of neutralizing converter 24 and to filter the output current of neutralizing converter 24. Capacitor C4 is not intended to filter the low frequency pulsating DC from first rectifier 22.

Neutralizing converter 24 is connected to first rectifier 22 and load 26 so that the output voltage of neutralizing converter 24 is added to the output voltage of first rectifier 22 before reaching load 26. In this embodiment, AC/DC converter 20 also includes output filter 34 disposed between the output of neutralizing converter 24 and the input of load 26. Output filter 34, like input filter 32, is also intended to reduce interference of the output of neutralizing converter 24.

The load for neutralizing converter 24 is required to have energy storage capacity. Thus, in this embodiment, load 26 comprises a battery. Alternatively, the load may include a large amount of capacitance, for example. For neutralizing converter 24 to deliver output power to load 26, the source of power is to provide power to neutralizing converter 24 through first rectifier 22 at all points in the AC cycle. Further, though the input AC power fluctuates between a maximum value at the peak of each sinusoidal cycle and a zero value at zero crossing, the voltage across load 26 must remain nearly constant. Therefore, load 26 cyclically behaves as a power source for neutralizing converter 24 keeping the input voltage of neutralizing converter 24 nearly constant.

Figure 11:
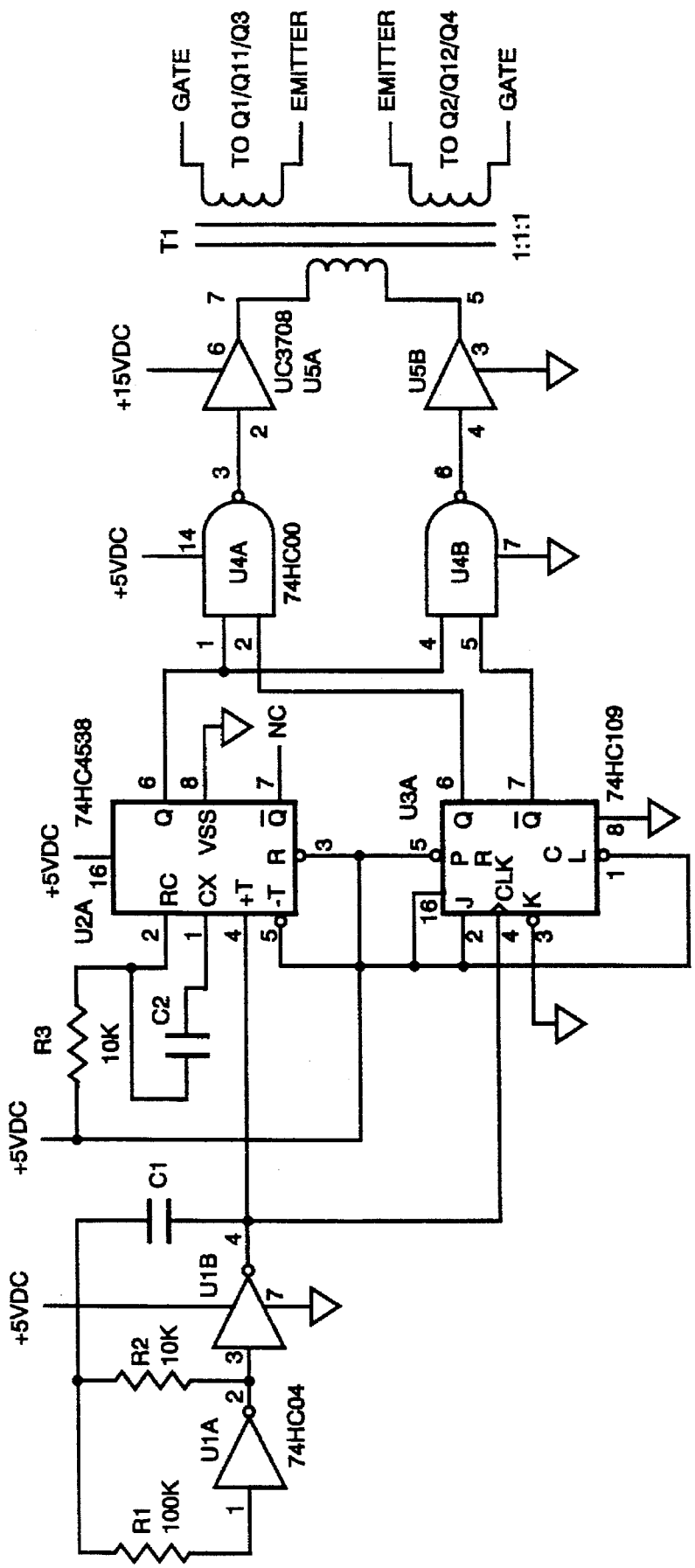
FIG. 11 is a schematic of a fixed frequency gate drive.
Figure 12:
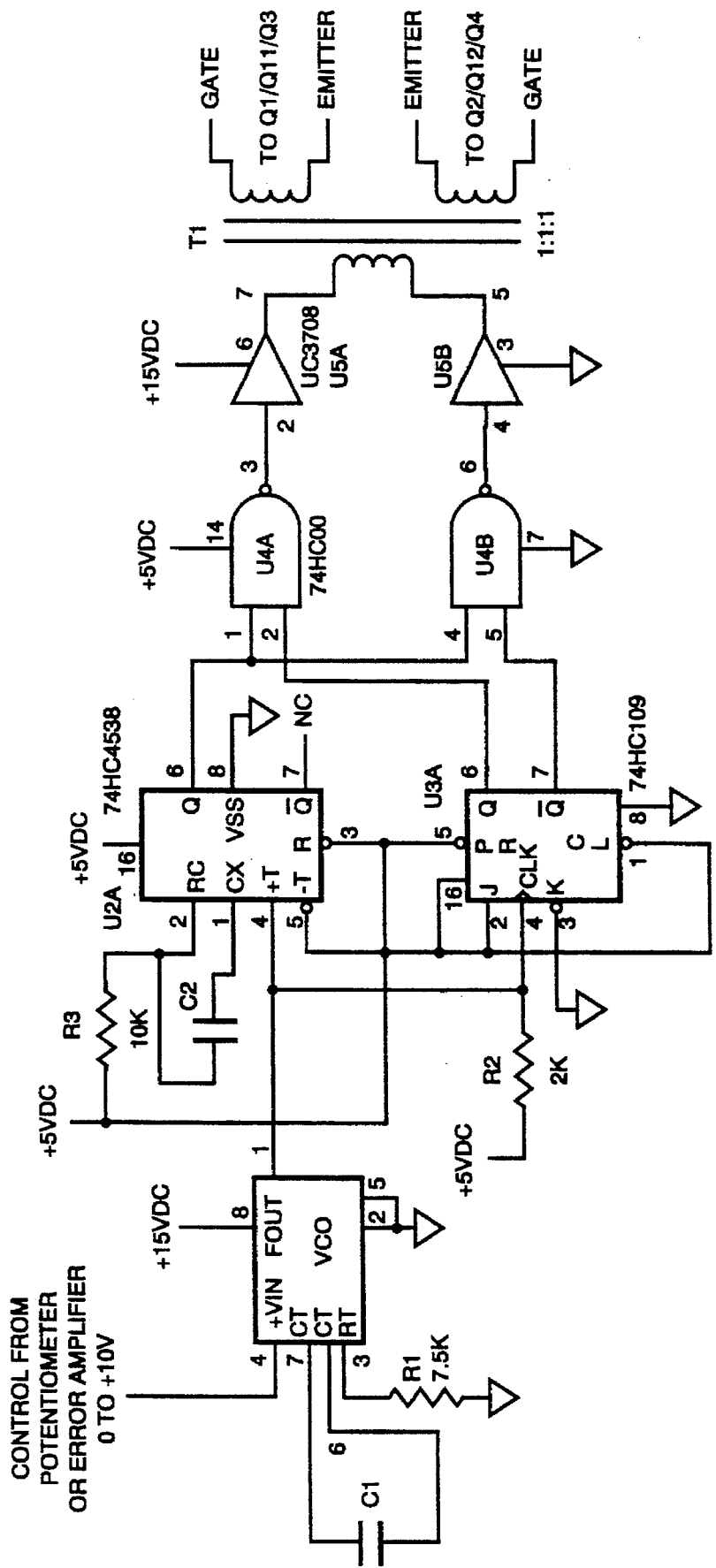
FIG. 12 is a schematic of a controlled frequency gate drive.

In this embodiment harmonic neutralizing converter 24 comprises second full-wave bridge rectifier 28 (CR11) and power switching circuit 30. Power switching circuit 30 includes transformer T11 at the output of converter 24 which isolates the output of neutralizing converter 24 from the input. As previously described, transformer T11 typically handles less than one-third of the total output power ($V_2$ is equal to or slightly greater than V1). Also, T11 operates at high frequency and therefore is small in size. Power switching circuit 30 also includes capacitor C11. Transformer T11 and capacitor C11 form a series resonant tank or series LC resonant circuit; the resonating inductance can be designed into transformer T11 as a combination of leakage and magnetizing inductance. In addition to transformer T11 and capacitor C11, power switching circuit 30 also includes IGBTs Q11 and Q12, or other appropriate semiconductor switching devices, and capacitors C12 and C13. IGBTs Q11 and Q12, which include antiparallel diodes, together with capacitors C12 and C13 form an inverter. As is well known in the art, the application of switching pulses to IGBTs Q11 and Q12 from a suitable pulse generator source as shown in FIG. 11 or FIG. 12 will deliver an AC signal of the appropriate frequency, typically with an IGBT power stage of 20 to 200 KHz, to resonant tank circuit C11, T11. FIG. 11 illustrates a fixed frequency gate drive pulse generator source wherein the value of C1 is chosen to provide the proper operating frequency of the power stage, and the value of C2 is chosen to provide the desired on-time for Q1/Q11 and Q2/Q12. FIG. 12 illustrates a controlled frequency gate drive when the values of C1 and C2 are chosen based on the same criteria as indicated above in connection with FIG. 11. Thus, power switching circuit 30 functions as a resonant DC to AC converter to provide to rectifier CR11 an AC signal that is rectified and added to the output from rectifier 22 to produce the desired charging voltage and current for battery 26.

The disclosures of co-pending patent applications Attorney Docket G-10013, entitled "Power Converter With Harmonic Neutralization", Attorney Docket H-129112, entitled "Multi-Phase Power Converter With Harmonic Neutralization", and Attorney Docket H-169109, entitled "Multi-Phase Power Converter With Harmonic Neutralization" relating to other configurations of power converters sharing a certain commonality of architecture with the power converters of the present application are expressly incorporated herein by reference.

Figure 4:
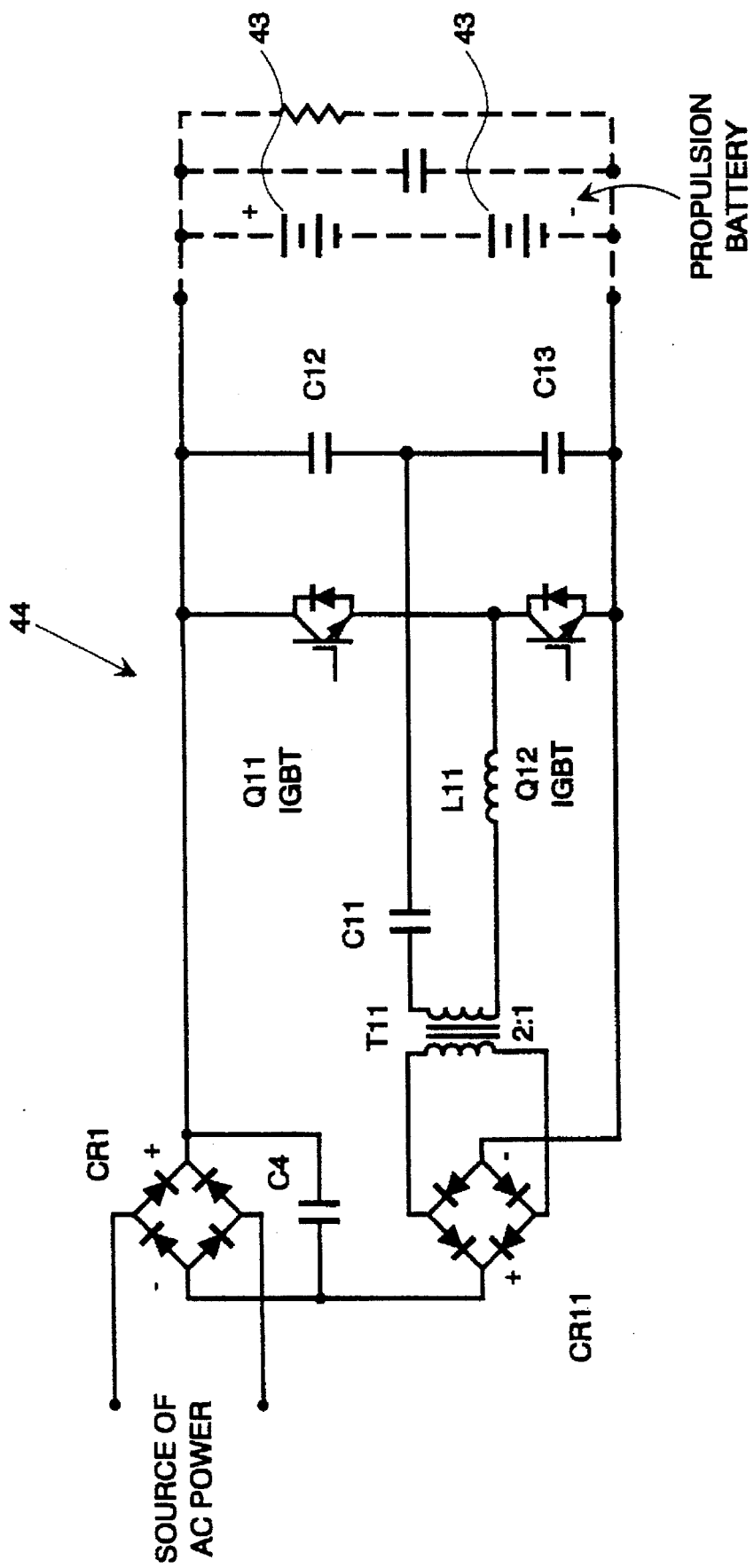
FIG. 4 is a schematic diagram of a battery charger circuit using one embodiment of the harmonic neutralizing power converter of the present invention.

FIG. 4 shows a schematic diagram of a battery charger using one embodiment of the power converter of the present invention. Input and output electromagnetic interference filters are eliminated from the battery charger for illustrative purposes but may be incorporated in a manner as is shown in FIG. 3. Neutralizing converter 44 is the same as neutralizing converter 24 of FIGS. 1 and 3 and neutralizing converter 44 functions in substantially the same manner as neutralizing converter 24 of FIGS. 1 and 3. The input of power switching inverter (Q11, Q12, C12, C13, C11) is connected to the load terminals of battery 43 to periodically receive energy from battery 43. For clarity, the EMI filters shown in FIG. 3 are not shown in FIG. 4. It is possible for the neutralizing converter of FIG. 4 to function both in controlling battery charging current and in neutralizing input harmonic current.

It will be appreciated by those of skill in the art that link converter 42 and neutralizing converter 44 of battery charging circuit 40 may be replaced with PWM converters. PWM converters have a voltage source characteristic, i.e., at a fixed pulse width and frequency, the output voltage of a PWM converter is directly proportional to the input voltage and independent of the output current. To neutralize harmonics, the output load line from a PWM converter can only be made suitable by modulating its switching. Thus, PWM converters could be used in the embodiment of FIG. 4 if their switching is so modulated. However, because of the numerous inherent disadvantage of a PWM converter, the present invention contemplates the use of resonant converters for achieving harmonic neutralization.

A resonant converter, as previously discussed, tends to have a current source characteristic, i.e., at a fixed frequency and below its cutoff voltage the output current of a resonant converter is directly proportional to the input voltage and is independent of the output voltage. The output load line of a resonant converter generally can only be made suitable by modulating its operating frequency. An ordinary series resonant converter, such as neutralizing converter 44 of FIG. 4, usually does not neutralize harmonics well unless its operating frequency is controlled. Neutralizing converter 44 may be controlled by means well known in the art by adjusting its operating frequency. In this embodiment, its operating frequency is controlled, by means of a gate drive circuit such as that of FIG. 12, to cause the output to follow a load line similar to that of FIGS. 2A–2B. However, it is possible to achieve harmonic neutralization without adjusting the operating frequency of the neutralizing converter, i.e., with the converter operating at a fixed operating frequency.

Rectifier bridge CR1 and its filter capacitor C4 rectify and filter the AC provided by the power line. The resulting output is a full wave rectified, quasi-sinusoid at 60 Hz (or 50 Hz). Connected at the output of transformer T11 is a series tank circuit comprising capacitor C11 and discrete inductor L11.

Figure 5:
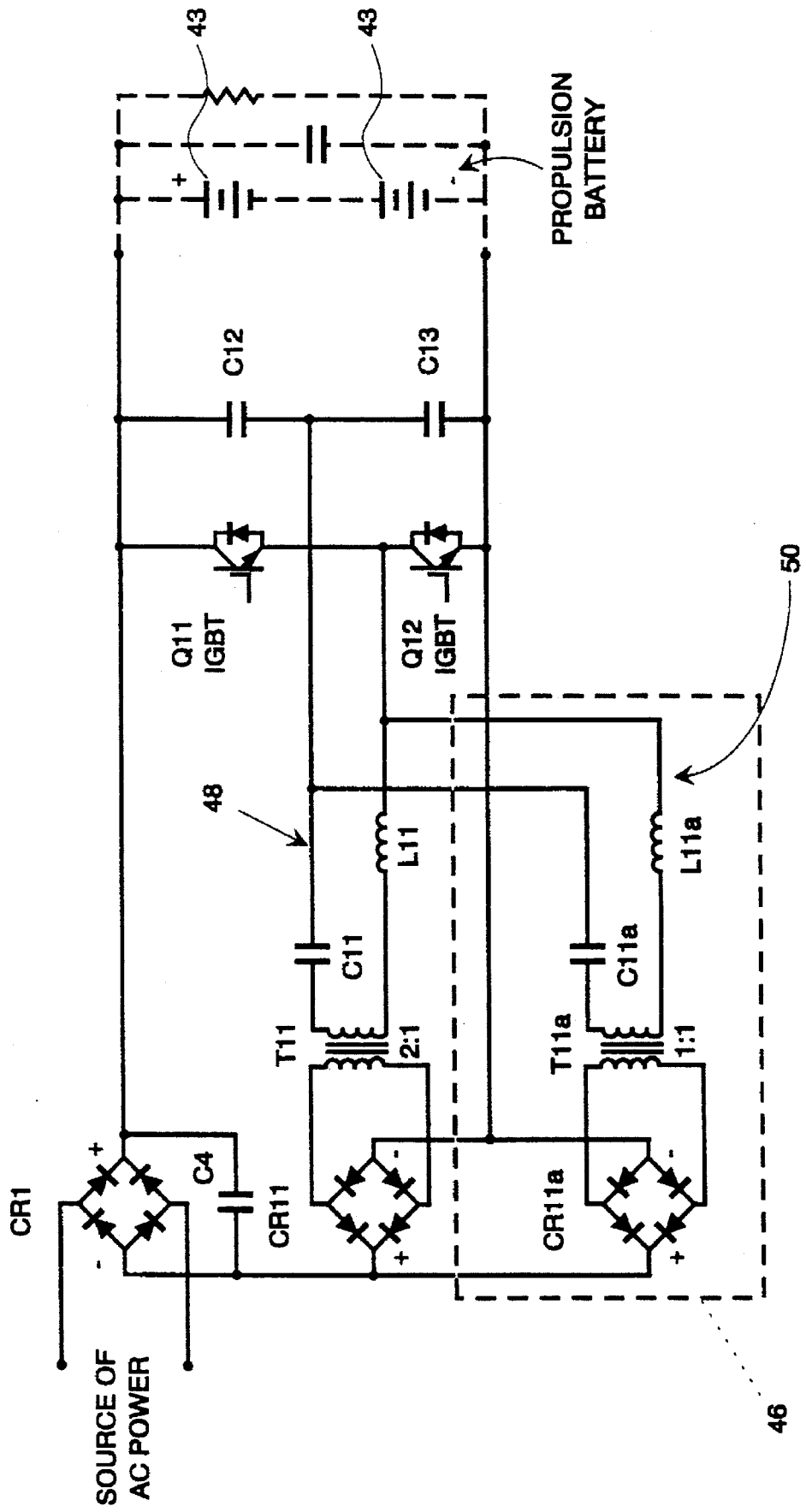
FIG. 5 is a schematic diagram of a battery charger circuit using a second embodiment of the harmonic neutralizing power converter of the present invention in which the converter includes a second output stage.

FIG. 5 illustrates one of three variants which improves the performance of the neutralizing converter, especially when operation at a fixed frequency is desired. This is generally necessary when the power switches of the neutralizing converter drive multiple outputs. In FIG. 5, a second output stage 46 comprising rectifier CR11a, transformer T11a, capacitor C11a and discrete inductor L11a is provided. This creates a stepped approximation to the neutralizing converter's ideal load line. More steps can be utilized to provide more effective harmonic neutralization. At one extreme operating point, where the current output of this converter is a maximum and voltage a minimum, both tank circuits 48 and 50, through their output bridges CR11 and CR11a, provide approximately equal current. At the other extreme operating point, where the output voltage is a maximum and current nearly zero, bridge CR11 provides little current and bridge CR11a provides none. With a primary to secondary turns ratio of 1:2, tank circuit 48 sees approximately the maximum voltage at which it can supply current. This is also true of the other tank 50, except with the 1:1 turns ratio of transformer T11a, the output voltage is approximately twice that at which it can supply current. At the midpoint of the load line where the converter's output current should be one-half of the maximum, it is so. Since nearly all the current is supplied by tank circuit 48, tank circuit 50 sees approximately the maximum voltage at which it can supply current and therefore supplies little.

In spite of the fact that this approximation to a straight line consists of only two steps, the performance of this configuration is fair. While operating at a fixed frequency of 75 kHz, input current total harmonic distortion (THD) of less than 20% any power factor of greater than 0.98 can be achieved. Since both tanks 48 and 50 share in delivering power, either is smaller than the single tank circuit of FIG. 4. The quality of neutralization for the circuit of FIG. 5 is adequate for power supplies and battery charges operating up to approximately 1.5 kW. More stages could be added to improve performance.

Figure 6:
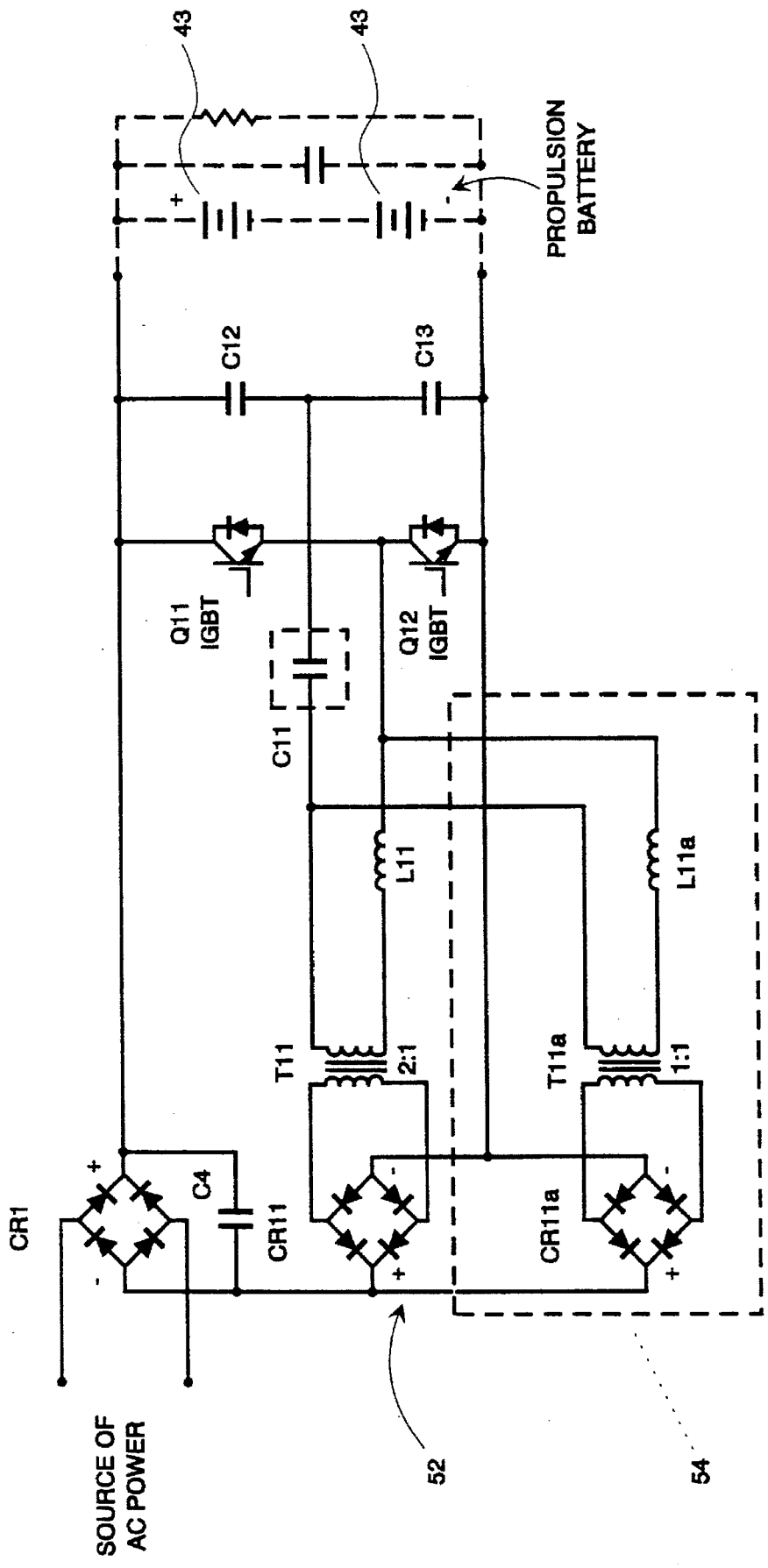
FIG. 6 is a schematic diagram of a battery charger circuit using a third embodiment of the harmonic neutralizing power converter of the present invention wherein a single tank circuit is shared by the two stages.

FIG. 6 is a schematic diagram of a second of three variants which improve the performance of the neutralizing converter. Unlike the configuration shown in FIG. 5, the converter of FIG. 6 has only one tank circuit shared by stages 52 and 54. There is a single resonating capacitor C11 and the resonating inductance is the parallel combination of the inductances of inductors L11 and L11a.

At one extreme operating point, where the converter's output current is a maximum and its voltage at a minimum, the output circuit consisting of bridge CR11 and transformer T11 provides this current. At this point, a small current is bootstrapped back to the input of the neutralizing converter by bridge CR11a and transformer T11a. At the other extreme operating point, where the output voltage is at a maximum and the current is nearly zero, CR11 provides little current. The bootstrapped output from CR11a provides approximately 40% of the maximum current achieved by the CR11 output at the other extreme operating point. This is the point where the highest value of output current is supplied by CR11a. The load line between these two extreme points is quite linear. As desired, at the midpoint of the output voltage, the output current of CR11 is close to 50% of its maximum value.

By combining transformers T11 and T11a into a single transformer, it is possible to simplify the magnetics in the configuration of FIG. 6. As before, it is necessary to design for a specific value of leakage inductance between the primary and secondary which drives CR11. It is also necessary to design for the leakage between the primary and the other secondary. The leakage inductance between the two secondaries should be made as large as possible.

Figure 7:
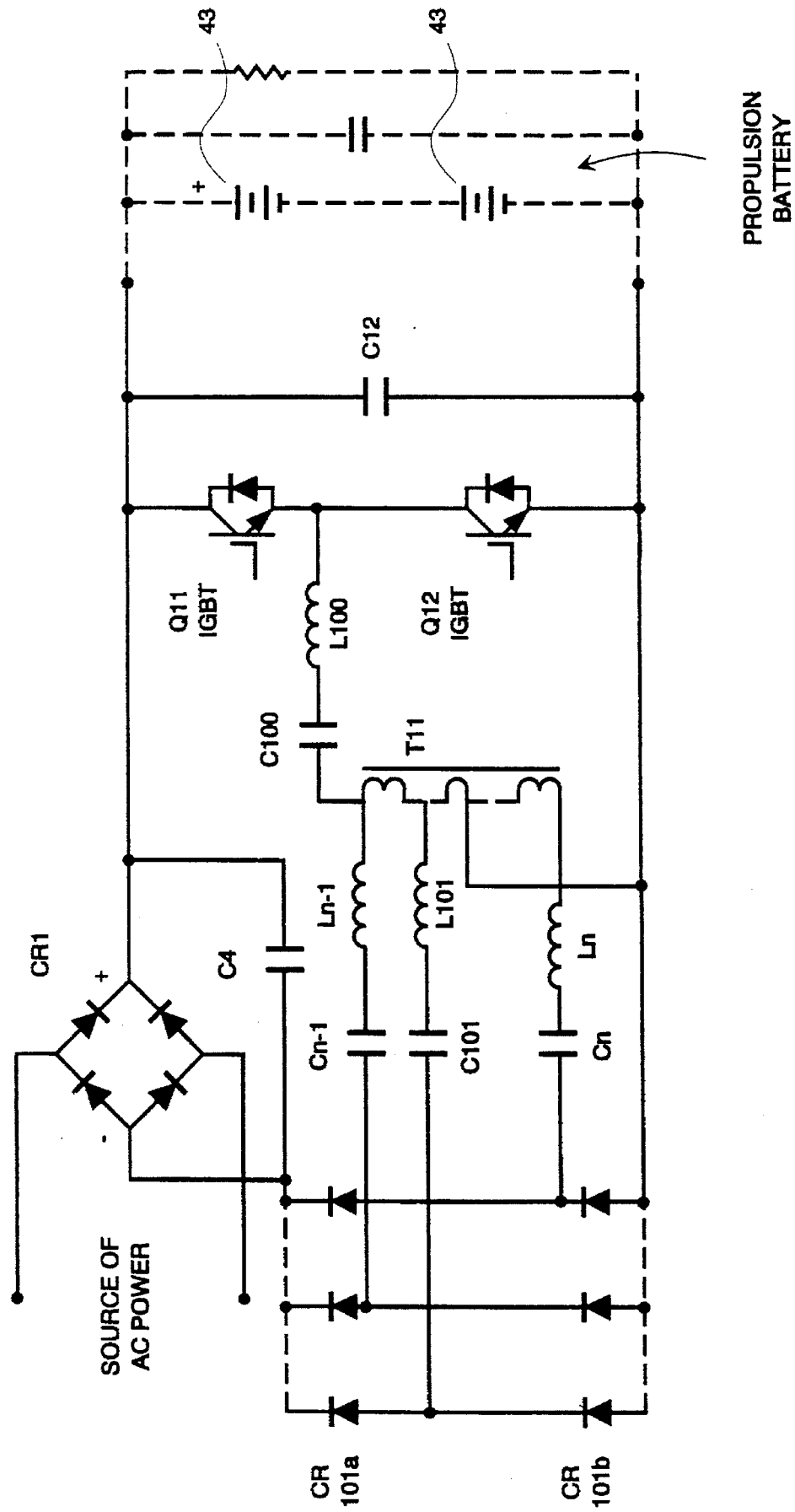
FIG. 7 is a schematic diagram of a battery charger circuit according to a fourth embodiment of the present invention utilizing an autotransformer.

FIG. 7 is a schematic diagram of the third of three variants which improve the performance of the neutralizing converter. Like the configurations of FIGS. 5 and 6, this configuration permits operation of the resonant converter at a fixed frequency.

Neutralizing transformer T11 is driven by an input resonant tank comprising capacitor C100 and discrete inductor L100. Capacitor C100 also provides a DC offset equal to ½ the voltage across capacitor C12, the bypass capacitor. The output of transformer T11 drives several L-C tanks, namely, tanks comprising L101 and C101 through Ln and Cn. Typically, the number of output tanks range from 3 to 6. A larger number of output tanks provides better neutralization. With 5 output tanks, it has been shown that the THD of the input current can be held below 7%. Since the output tanks share the output current, each can have a volt-amp rating of a fraction of that of the input tank C100, L100. For the same reason, the rectifiers of CR101, CR102, . . . , CRn can have a lower current rating than those of CR1.

Figure 8:
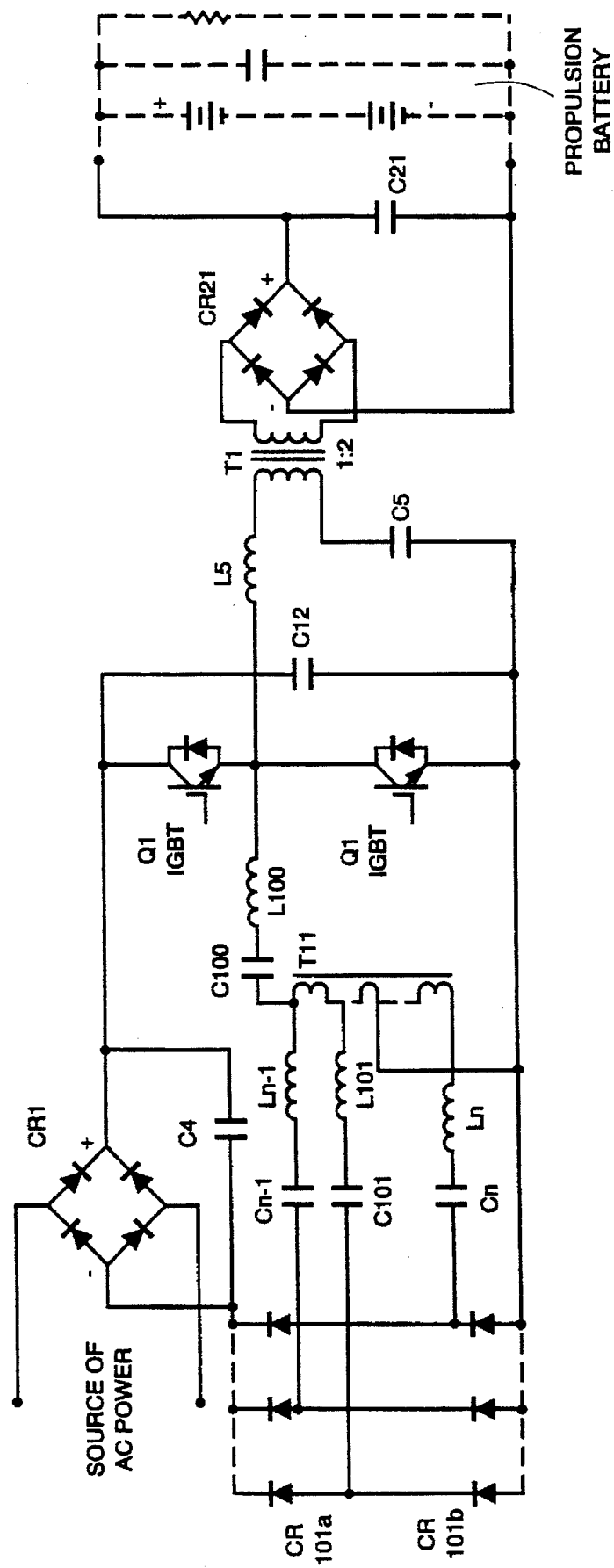
FIG. 8 is a schematic diagram of a battery charger circuit using a fifth embodiment of the harmonic neutralizing power converter of the present invention incorporating an isolation transformer.

Referring now to FIG. 8, the configuration as shown herein should offer a highly favorable compromise between cost and performance. The configuration of FIG. 8 is included in the variations shown in FIGS. 9 and 10 which will be described at a later point.

The configuration of FIG. 8 adds an output isolation transformer T1 to the neutralizing converter of the configuration shown in FIG. 7. Inductor L5 and capacitor C5 are the associated resonant tank components, and capacitors C100 and C5 provide DC blocking. The bootstrap use of all of the neutralizing converters disclosed in this application is regenerative in behavior. Therefore, as the load, voltage, for example in a propulsion battery, is allowed to increase, the output of the neutralizing converter increases proportionately. An increase in the output of the neutralizing converter causes an increase in the load voltage. Thus, it is mandatory that the load be receptive and limit its voltage appropriately. If this can not be insured, over-voltage protection is necessary. Over-voltage sensing can be used to lower the output of the neutralizing converter, typically by reducing converter operating frequency.

Since the configuration of FIG. 8 is indirectly coupled to the load through the load tank L5, C5 and transformer T1, regenerative runaway is an increased threat over the configuration shown in FIG. 7. To permit safe operation over a wide range of load voltage, tank L5, C5 should be designed with an unusually low characteristic impedance. Thus, the output circuit rather closely exhibits a voltage source characteristic. The output load tank operation can be at approximately 0.5 times the resonant frequency. Alternatively, because the output load tank is operated in a "current starved" mode, the operating frequency can be increased to nearly the resonant frequency without the onset of hard switching.

Common to all of the configurations discussed, the operation of the neutralizing tank results in zero current, i.e., soft, switching. Likewise, operation of the output load tank in a "current starved" mode results in zero current switching.

Figure 9:
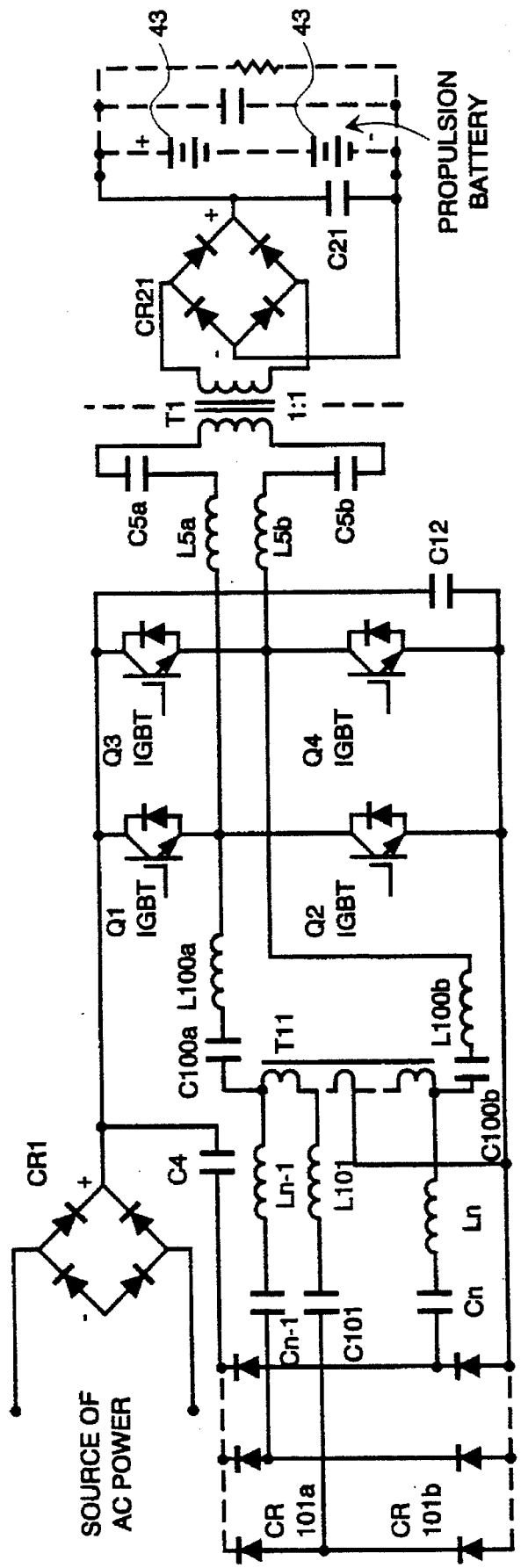
FIG. 9 is a schematic diagram of a battery charger circuit according to a sixth embodiment of the present invention utilizing full-bridge switching.

Reference is now made to FIG. 9. For the sake of simplicity, all of the configurations presented thus far have been unbalanced and use half-bridge switching. While these function well, their production of conducted hand radiated EMI may be intolerably high. Improvements could be made by converting the configurations given above to symmetrical full-bridge switching, which is especially worthwhile for operation at high power levels.

The configuration shown in FIG. 9 is a balanced design using full-bridge switching, and offers low EMI production, even at high powers levels. The voltage (at 100 Hz or 120 Hz) across capacitor C12 is known as the DC link voltage. Where the link is poorly filtered, such as when capacitor C12 is relatively small, the link has high ripple voltage at the second harmonic of the source of the AC input power. Thus, this configuration, as well as previously present configurations, provide an output current waveform that is approximately sine-squared. The average value of the link voltage is within a few volts of the battery voltage.

In general BJT's MOSFET's MCT's or IGBT's can be used for Q1, Q2, Q3 and Q4. It is believed that IGBT's offer the best performance tradeoffs in high power applications. For this reason, and to ensure the low EMI production associated with soft switching, the following are used:

a) on-state gate drive for approximately 90% of each operating half-cycle;

b) Q1 and Q4 have identical timing (likewise Q2 and Q3);

c) switching operation at approximately 50% of the resonant frequency of the combined neutralizing resonant tanks (C100, L100, C101, L101, etc.);

d) switching operation at 50% to 90% of the resonant frequency of the induction port tank(s) (C5, L5, T1). Note that sufficient on-time for the gate drive ensures the independence of the currents in the neutralizing tanks from those in the induction port, where induction coupling through transformer T1 is used to charge batteries 43.

Figure 10:
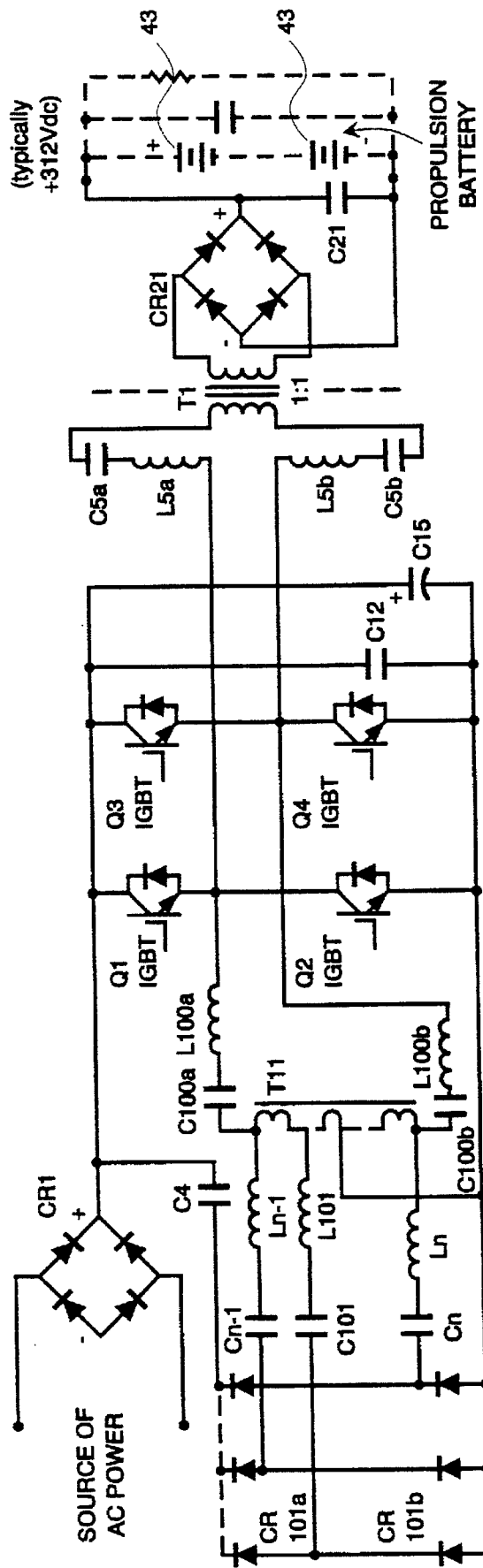
FIG. 10 is a schematic diagram of a battery charger circuit according to a seventh embodiment of the present invention.

The configuration as shown in FIG. 10 is similar to the configuration of FIG. 9 but adds a large amount of capacitance across the DC link by providing a second capacitor C15 connected in parallel with capacitor C12. Capacitor C15 has a value of typically several thousand microfarads. As C15 is increased in value above a few hundred microfarads, link ripple is decreased and the battery charge current waveform approaches pure DC. The quality of the input current harmonic neutralization and the output power have been found to be quite independent of the value of C15.

The control of the output power of the system or control of the systems output current can be achieved by the control of the neutralizing converter. The simplest approach uses the control of the output of the neutralizing converter. If the converter is of a resonant type, such as disclosed previously, this can be accomplished by varying its operating frequency, by replacing the neutralizing transformer T11 with a controlled-K resonating transformer of the type disclosed in co-pending application Attorney Docket G-10009 entitled "Controlled-K Resonating Transformer" or by modifying the neutralizing input tank, L100 and C100.

Figure 13:
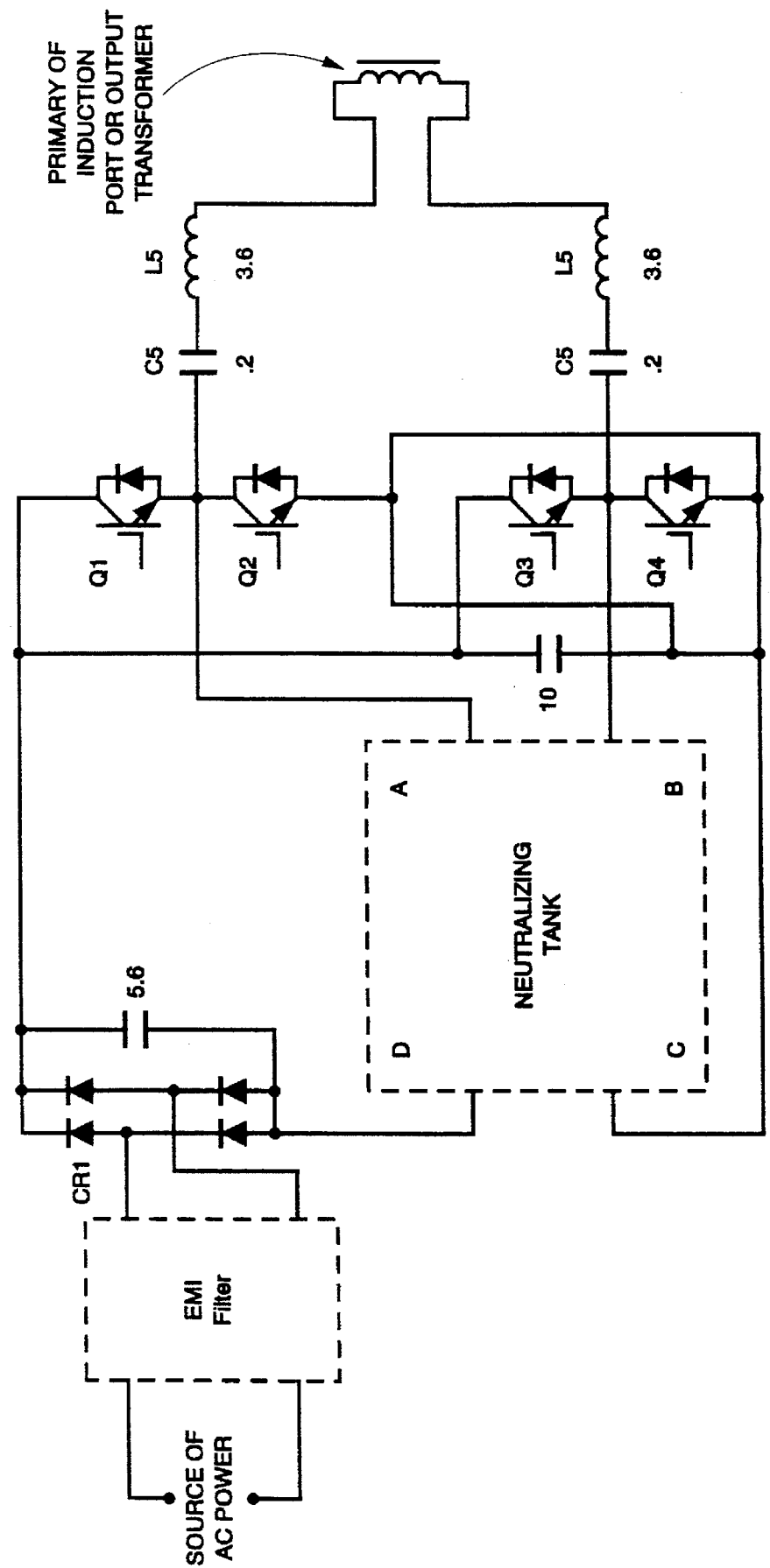
FIG. 13 is a schematic diagram of a further embodiment of a battery charger circuit according to the present invention.

FIG. 13 is a simplified diagram of a 1500 watt battery charger having a source of AC power at 120 Vac at 60 Hz and operating at 125 kHz and having the component values illustrated. The operation of the battery charger of FIG. 13 is substantially the same as the previous embodiments, but includes one of two alternative neutralizing tanks including the autotransformers illustrated in FIGS. 14 and 15.

Figure 14:
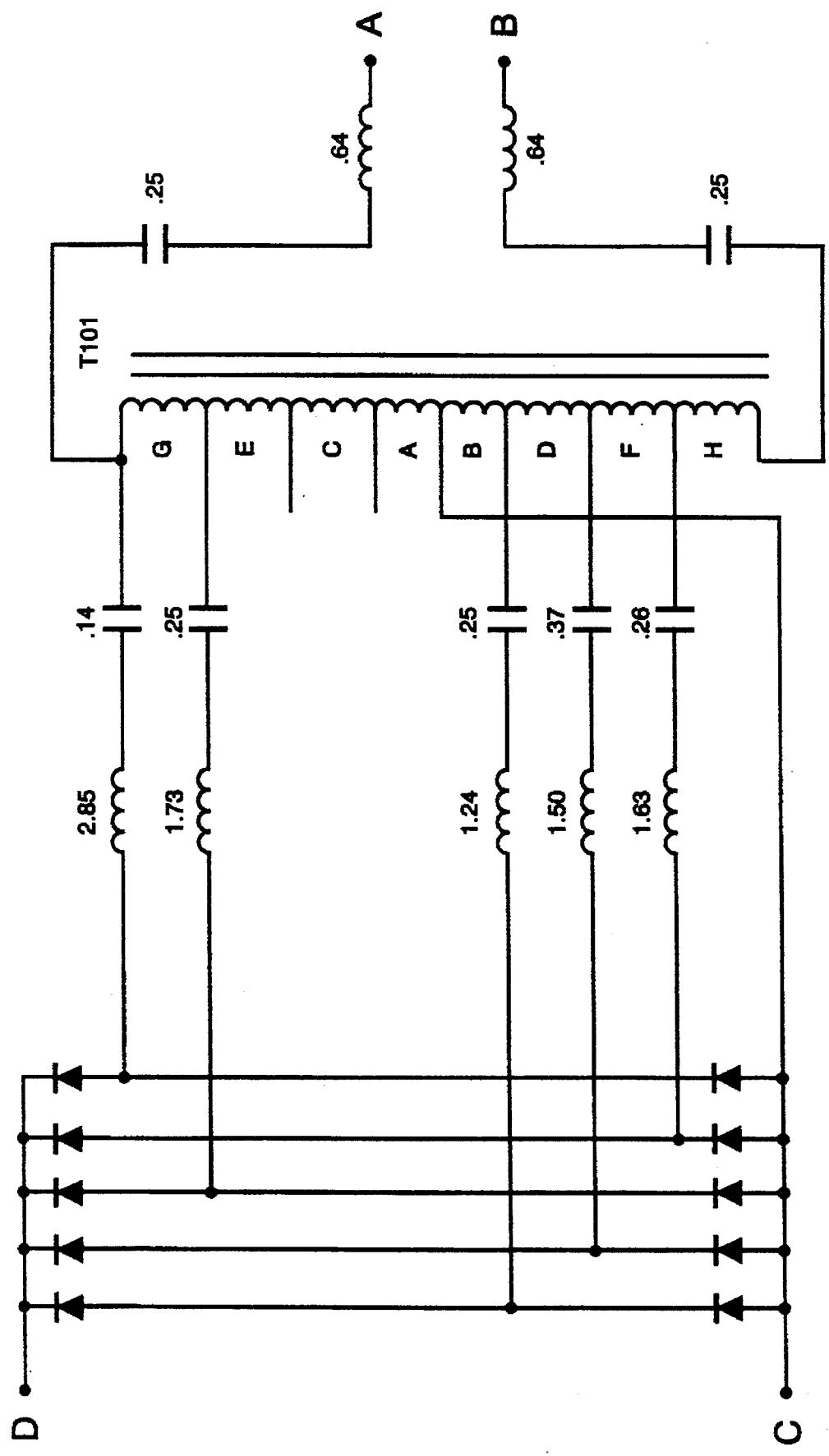
FIG. 14 is a schematic diagram of a neutralizing tank circuit utilizing a symmetric autotransformer for use in the circuit of FIG. 13.

FIG. 14 is a schematic diagram of a neutralizing tank circuit which utilizes a symmetric autotransformer T101 wherein windings A and B each have three turns and windings C, D, E, F, G and H each have four turns. Windings A+C+E+G=15 turns, and windings B+D+F+H=15 turns. The circuit of FIG. 14 produces a stepped approximation to a sine wave of input current.

Figure 15:
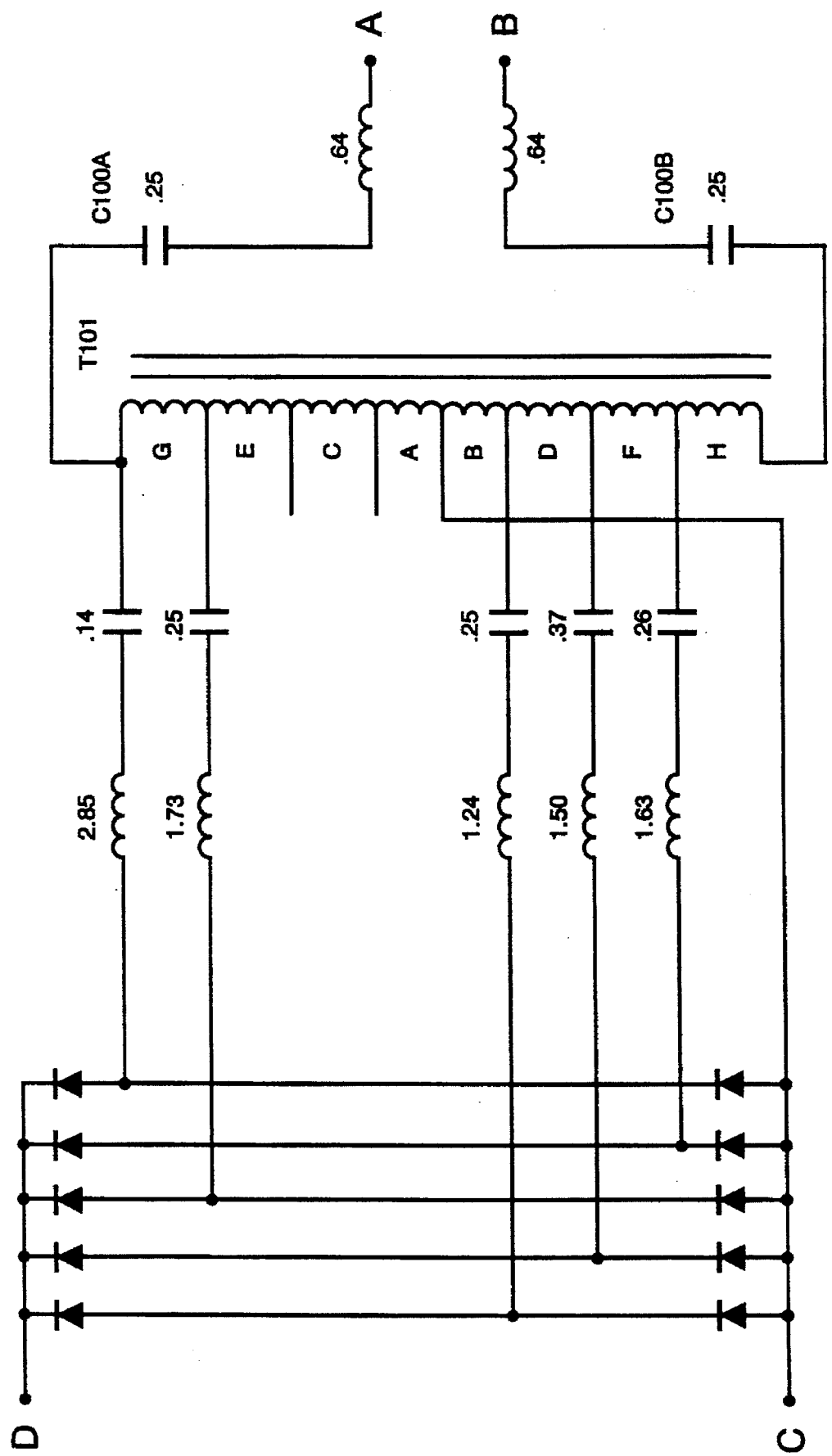
FIG. 15 is a schematic diagram of a neutralizing tank circuit utilizing an asymmetric transformer for use in the circuit of FIG. 13.

FIG. 15 is a schematic diagram of a neutralizing tank circuit which utilizes an asymmetric transformer 101, which is asymmetric with respect to its drive. The circuit components have the values indicated, and in autotransformer T101, winding A has two turns and windings B, C, D, F, G and H each have four turns. Windings A+C+E+G total fourteen turns and windings B+D+F+H total 16 turns. If autotransformer T101 were directly coupled to the power switches, it would have to support direct current, which would result in less than desirable functioning. However, because it is capacitively coupled through resonating capacitors C100A and C100B, there is no direct current produced in its drive. The value in the asymmetric (as opposed to the symmetric) autotransformer is that, when its taps and tank components are carefully chosen, an interpolation or smoothing of the steps results. This causes a marked reduction in the harmonic current components of input current. Total harmonic distortion THD in the range of 2% to 6% can be achieved. Autotransformer T101, in respects other than its asymmetry, is constructed in a conventional manner. For consistency in its reproduction, it is desirable to design it with low leakage between its windings. In particular, it may be desirable to ensure that the leakage is low between windings A and B, B and C, C and D, D and E, E and F, F and G, and G and H. Layered windings using litz wire within a ferrite pot core will work well.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The embodiments of the invention in which an exclusive property or privilege is claimed are defined as follows:

1. An AC to DC power converter comprising:

a first rectifier having an input to receive AC input power and having an output with an output voltage thereon;

load output terminals for delivering DC power to a load; and a harmonic neutralizing converter comprising a power switching inverter having an input connected to the output of said first rectifier, said inverter including an LC resonant circuit and an output, said LC resonant circuit comprising a capacitor and an inductor connected in series, said harmonic neutralizing converter further comprising a second rectifier having an input connected to the output of said inverter through a transformer and having an output with an output voltage thereon connected in a voltage additive relationship to the output of said first rectifier, the outputs of said first and second rectifiers forming added outputs, said added outputs connected to said load terminals whereby an output voltage on the load terminals substantially equals added output voltages of said first and second rectifiers.

2. The power converter of claim 1 wherein said inverter includes switching means for converting DC input from said first rectifier to an AC output through said LC resonant circuit.

3. The power converter of claim 2 wherein said switching means is driven by a controlled variable frequency source.

4. The power converter of claim 2 wherein said switching means is driven by a constant frequency source.

5. The power converter of claim 1 wherein said load comprises a battery connected to said load terminals, and the input of said power switching inverter is connected to said load terminals to receive energy from said battery.

6. The power converter of claim 1 further comprising at least one additional output stage for creating a stepped approximation of a linear voltage-current load line of said power converter, said output stage comprising:

a third rectifier connected in parallel with said second rectifier, and a second resonant LC circuit comprising a further capacitor and inductor connected to said second rectifier and in parallel with the first resonant LC circuit.

7. The power converter of claim 6 wherein said inverter includes switching means for converting DC input from said first rectifier to an AC output through each of said resonant circuits, and wherein said switching means is driven by a constant frequency source.

8. The power converter of claim 1 further comprising at least one additional output stage for creating a stepped approximation of a linear voltage-current load line of said power converter, said output stage comprising a second inductor connected in parallel with the first mentioned inductor and a third rectifier connected in parallel with said second rectifier and in series with said second inductor.

9. An AC to DC power converter comprising:

a first rectifier having an input to receive AC input power and having an output with an output voltage thereon;

load output terminals for delivering DC power to a load; and a harmonic neutralizing converter comprising a power switching inverter having an input connected to the output of said first rectifier, said inverter including an LC resonant circuit and an output;

said harmonic neutralizing converter further comprising a second rectifier having an input connected to the output of said inverter through an autotransformer and having an output with an output voltage thereon connected in a voltage additive relationship to the output of said first rectifier, the outputs of said first and second rectifiers forming added outputs, said added outputs connected to said load terminals whereby an output voltage on the load terminals substantially equals added output voltages of said first and second rectifiers.

10. The power converter of claim 9 wherein said LC resonant circuit comprises a series connected capacitor and inductor connected to an output of said autotransformer.

11. The power converter of claim 10 wherein said load comprises a battery connected to said load terminals, and the input of said power switching inverter is connected to said load terminals to receive energy from said battery.

12. The power converter of claim 9 further comprising an isolating transformer connected between said neutralizing converter and said load terminals to thereby provide for inductive coupling of power to said load terminals.

13. The power converter of claim 12 including a second LC resonant circuit connected to an input of said isolating transformer and a third rectifier connected to an output of said isolating transformer.

14. The power converter of claim 9 including a second LC resonant circuit driven by said autotransformer.

15. The power converter of claim 14 including: a plurality of said second LC resonant circuits driven by said autotransformer, and a plurality of further rectifiers associated respectively with said second LC resonant circuits and connected in parallel with said second rectifier.

16. The power converter of claim 9 wherein said autotransformer is asymmetric.

17. An AC to DC power converter comprising:

a first rectifier having an input to receive AC input power and having an output with an output voltage thereon;

load output terminals for delivering DC power to a load;

a harmonic neutralizing converter comprising a power inverter using full bridge switching and having an input connected to the output of said first rectifier; and an autotransformer;

said neutralizing converter comprising first and second LC resonant circuits connected respectively to separate inputs of said transformer and further comprising a second rectifier having an input connected to the output of said inverter through said autotransformer and having an output with an output voltage thereon connected in a voltage additive relationship to the output of said first rectifier, the outputs of said first and second rectifiers forming added outputs, said added outputs connected to said load terminals whereby an output voltage on the load terminals substantially equals added output voltages of said first and second rectifiers.

18. The power converter of claim 17 wherein said autotransformer is asymmetric.

19. The power converter of claim 17 wherein each LC resonant circuit comprises a series connected capacitor and inductor.

20. The power converter of claim 17 further comprising an isolating transformer connected between said neutralizing converter and said load terminals to thereby provide for inductive coupling of power to said load terminals.

21. The power converter of claim 20 including a pair of further LC resonant circuits connected respectively to opposite input terminals of said isolating transformer and a third rectifier connected to an output of said isolating transformer.

22. The power converter of claim 17 including a second LC resonant circuit driven by said autotransformer.

23. The power converter of claim 22 including: a plurality of said second LC resonant circuits driven by said autotransformer, and a plurality of further rectifiers associated respectively with said second LC resonant circuits and connected in parallel with said second rectifier.

24. The power converter of claim 21 and including a large capacitance connected in parallel with the additive connection of said first and second rectifiers.

25. The power converter of claim 17 and including a large capacitance connected in parallel with the additive connection of said first and second rectifiers.

26. The power converter of claim 1 wherein said power switching inverter simultaneously neutralizes the AC input power and regulates the flow of power to said load output terminals.

* * * * *